(No Model.)  
2 Sheets—Sheet 1.

J. R. LITTLE.
METAL WHEEL.

No. 361,637.  
Patented Apr. 19, 1887.

Witnesses  
Chas. J. Williamson  
Henry C. Hazard

Inventor  
James R. Little, by  
Prindle and Russell, his Attys (No Model.) 2 Sheets—Sheet 2.

J. R. LITTLE.
METAL WHEEL.

No. 361,637. Patented Apr. 19, 1887.

Witnesses
Chas. J. Williamson
Henry C. Hazard

Inventor:
James R. Little, by
Prindle and Russell, his Attys

UNITED STATES PATENT OFFICE.

JAMES R. LITTLE, OF QUINCY, ILLINOIS, ASSIGNOR TO THE QUINCY METAL WHEEL COMPANY, OF SAME PLACE.

METAL WHEEL.

SPECIFICATION forming part of Letters Patent No. 361,637, dated April 19, 1887.

Application filed July 2, 1886. Serial No. 206,974. (No model.)

*To all whom it may concern:*

Be it known that I, JAMES R. LITTLE, of Quincy, in the county of Adams, and in the State of Illinois, have invented certain new and useful Improvements in Metal Wheels; and I do hereby declare that the following is a full, clear, and exact description thereof, reference being had to the accompanying drawings, in which—

Figure 1:
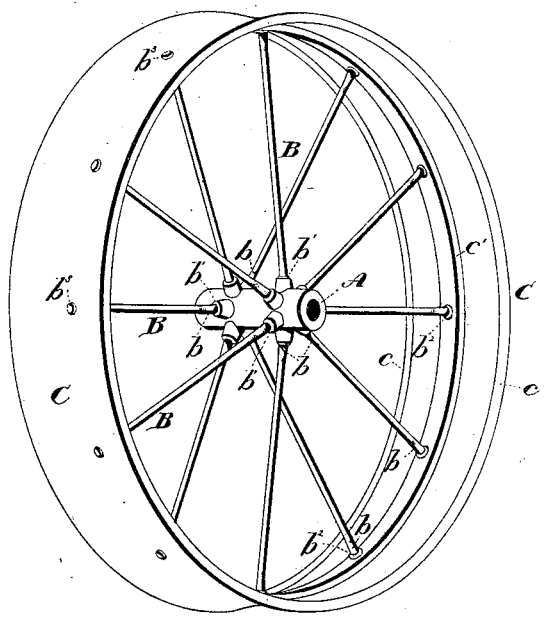
Figure 2:
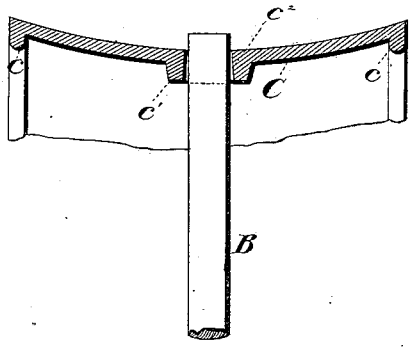
Figure 3:
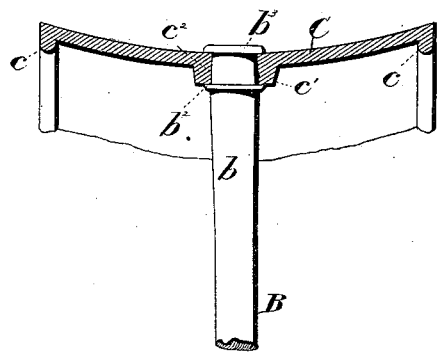
Figure 4:
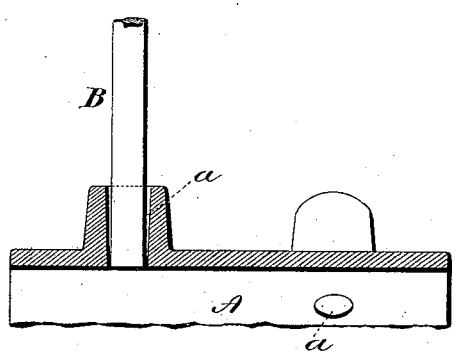
Figure 5:
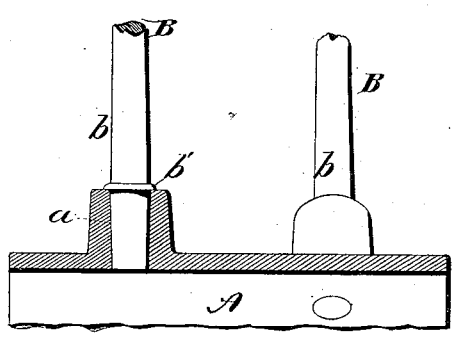

Figure 1 is a perspective view of my improved wheel. Fig. 2 is an enlarged cross-section of a portion of the rim and an elevation of the connecting end of one of the spokes before the same are united. Fig. 3 is a like view of said parts after having been combined. Fig. 4 is an enlarged axial section of one side of the hub and an elevation of the connecting end of a spoke before the same are combined, and Fig. 5 is a like view of said parts after they have been united.

Letters of like name and kind refer to like parts in each of the figures.

In the use of metal wheels the greatest strain upon the spokes is where each enters the hub and rim, and when injury or breakage of a spoke occurs it is nearly always at one of such points, and usually results from a lack of strength rather than from a defect in the metal. Another difficulty sometimes arises from the imperfect filling of a spoke-mortise, in consequence of which such spoke will work loose and soon render the wheel worthless for the purposes intended.

To remedy these difficulties is the main design of my invention, which invention consists, principally, in a metal wheel in which each of the spokes is enlarged at the points where it unites with the hub and rim, and from such points toward its longitudinal center has a decreasing diameter, substantially as and for the purpose hereinafter specified.

It consists, further, in a metal wheel in which the hub is provided with tapering mortises that are largest at their outer ends, and the rim is provided with mortises which are largest at their inner ends, and each of said mortises is closely filled by a spoke that from thence toward its longitudinal center has a decreasing diameter, substantially as and for the purpose hereinafter shown.

It consists, further, in a metal wheel in which the rim is provided with circumferential marginal ribs that are formed upon and integral with the same, substantially as and for the purpose hereinafter set forth.

It consists, further, in a metal wheel in which the rim is provided with a circumferential central rib and two circumferential marginal ribs, substantially as and for the purpose hereinafter shown and described.

It consists, further, in a metal wheel in which the rim is provided with circumferential marginal ribs, and has a transversely-concave face, substantially as and for the purpose hereinafter specified.

It consists, further, in a metal wheel in which the spokes have a smaller diameter at their longitudinal centers than at their ends, and the rim is provided with circumferential marginal ribs, substantially as and for the purpose hereinafter shown.

It consists, further, in a metal wheel in which the spokes have a smaller diameter at their longitudinal centers than at their ends, and the rim is provided with a central and two marginal circumferential ribs, substantially as and for the purpose hereinafter set forth.

It consists, further, in a metal wheel in which the spokes have a smaller diameter at their longitudinal centers than at their ends, and the rim is provided with circumferential marginal ribs, and has a transversely-concave face, substantially as and for the purpose hereinafter shown and described.

It consists, finally, in a metal wheel in which the spokes have a smaller diameter at their centers than at their ends, and the rim is provided with a central and two marginal circumferential ribs, and has a transversely-concave face, substantially as and for the purpose hereinafter specified.

In the carrying of my invention into practice I employ a metal hub, A, which has any desired exterior form, and is provided with a number of equidistant radial mortises, $a$, that are arranged in one row, or in two rows, as may best adapt them to the purpose for which the wheel is intended. Each of the mortises A has a slight increase in diameter from its inner end outward, and receives a spoke, B, that by longitudinal compression is caused to closely fill the same and to have at the periphery of the hub A a diameter considerably greater than the diameter of the central portion of said spoke. From the point of its intersection with said hub outward said spoke decreases regularly in diameter, such tapering portion being preferably about two inches in length. In consequence of the outward enlargement of the mortises each spoke, by longitudinal inward compression, will closely fill each portion of its mortise, so as to insure such intimate contact between the periphery of the former and the sides of the latter as to render impracticable the loosening of said spoke by any ordinary use, while in the case of hubs in which the spoke-mortises have a uniform diameter throughout their length, or where the inner end of each mortise is the larger, it sometimes occurs that the outer portion alone is filled and the central and inner portions of the spoke within such mortise are not sufficiently expanded to cause them to fill the same, the result of such defect being that the spoke is not properly secured in place, and by use of the wheel works loose.

The enlargement $b$ of the spoke B where it enters the hub, and its tapering form from thence outward, gives to said spoke such strength at such point as to prevent breakage, while in case of spokes that have the same diameter at their intersection with the hub and at their longitudinal centers they are liable to be broken off close to the hub under a strain which will only cause other portions to bend. Where the spoke has an increased diameter outside of the hub, but such increase terminates in a shoulder, instead of having the tapering form herein shown, the weak point is only transferred from the periphery of said hub to said shoulder.

Secured to the outer ends of the spokes B is a rim, C, which preferably has a transversely-concave outer face, and is provided upon its inner face, along each edge, with a rib, $c$, that operates to give increased stiffness to said rim and enables the body of the same to be constructed from thinner material than would otherwise be practicable. A central rib, $c'$, provided along the line of the spoke-mortises $c^2$, increases the strength of said rim and gives the necessary length to said mortises.

The mortises $c^2$ may be made of uniform diameter, or may be largest at either or both of their inner or outer ends, as desired; but, whatever their form, the spokes B are secured therein by longitudinal compression, as in case of the union of said spokes with the hub A, and each spoke has preferably an enlargement, $b$, at the rim C, and from thence inward decreases in diameter until it reaches its normal size. A bead, $b'$, is preferably formed upon each spoke adjacent to the outer face of said hub, a like bead, $b^2$, adjacent to the inner face of said rim, and a head, $b^3$, upon the outer end of said spoke, adjacent to the outer face of the latter; but either or all of the same may, if desired, be omitted.

Having thus described my invention, what I claim is—

1. A metal wheel in which each of the spokes is enlarged at the points where it unites with the hub and rim, and from such points toward its longitudinal center has a decreasing diameter, substantially as and for the purpose specified.

2. A metal wheel in which the hub is provided with tapering mortises that are largest at their outer ends, and the rim is provided with mortises which are largest at their inner ends, and each of said mortises is closely filled by a spoke that from thence toward its longitudinal center has a decreasing diameter, substantially as and for the purpose shown.

3. A metal wheel in which the rim is provided with circumferential marginal ribs that are formed upon and integral with the same, substantially as and for the purpose set forth.

4. A metal wheel in which the rim is provided with a circumferential central rib and two circumferential marginal ribs, substantially as and for the purpose shown and described.

5. A metal wheel in which the rim is provided with circumferential marginal ribs and has a transversely-concave face, substantially as and for the purpose specified.

6. A metal wheel in which the spokes have a smaller diameter at their longitudinal centers than at their ends, and the rim is provided with circumferential marginal ribs, substantially as and for the purpose shown.

7. A metal wheel in which the spokes have a smaller diameter at their longitudinal centers than at their ends, and the rim is provided with a central and two marginal circumferential ribs, substantially as and for the purpose set forth.

8. A metal wheel in which the spokes have a smaller diameter at their longitudinal centers than at their ends, and the rim is provided with circumferential marginal ribs and has a transversely concave face, substantially as and for the purpose shown and described.

9. A metal wheel in which the spokes have a smaller diameter at their centers than at their ends, and the rim is provided with a central and two marginal circumferential ribs and has a transversely-concave face, substantially as and for the purpose specified.

In testimony that I claim the foregoing I have hereunto set my hand this 26th day of June, 1886.

JAMES R. LITTLE.

Witnesses:
GEO. S. PRINDLE,
P. B. WILLIAMS.